United States Patent [19]

Maki et al.

[11] Patent Number: 4,638,203
[45] Date of Patent: Jan. 20, 1987

[54] ATTACHMENT STRUCTURE FOR BRUSH HOLDER SPRINGS

[75] Inventors: Yohji Maki; Norio Umezawa, both of Takefu, Japan

[73] Assignee: Matsushita Electric Industrial Co., Ltd., Japan

[21] Appl. No.: 749,472

[22] Filed: Jun. 21, 1985

[51] Int. Cl.[4] ............................................. H02K 5/14
[52] U.S. Cl. ..................................... 310/239; 310/244
[58] Field of Search ................. 310/40 MM, 219, 239, 310/242, 244, 246, 248, 249, 240, 247, 245

[56] References Cited

U.S. PATENT DOCUMENTS

| | | | |
|---|---|---|---|
| 805,499 | 11/1905 | Stoycheff | 310/239 |
| 823,569 | 6/1906 | Waters | 310/246 |
| 1,026,904 | 5/1912 | Burke | 310/244 |
| 1,552,256 | 9/1925 | Wood | 310/244 |
| 1,802,957 | 4/1931 | Ragsdale et al. | 310/244 |
| 2,358,958 | 9/1944 | Brown | 310/249 |

FOREIGN PATENT DOCUMENTS

| | | | |
|---|---|---|---|
| 721185 | 5/1942 | Fed. Rep. of Germany | 310/239 |
| 1062700 | 3/1967 | United Kingdom | 310/239 |

*Primary Examiner*—Patrick R. Salce
*Assistant Examiner*—D. L. Rebsch
*Attorney, Agent, or Firm*—Lowe, Price, LeBlanc, Becker & Shur

[57] ABSTRACT

An attachment structure for brush holder springs in a motor includes a motor bracket mounted on a motor frame. The bracket has a pair of diametrically opposite projections on inner peripheral wall surfaces thereof. A pair of brush holder springs each supporting on one end portion thereof a brush for sliding contact with a motor commutator have on an opposite end portion thereof a dovetail-shaped gripping members fitting complementarily over each projection, respectively, under resilient force.

4 Claims, 6 Drawing Figures

ATTACHMENT STRUCTURE FOR BRUSH HOLDER SPRINGS

BACKGROUND OF THE INVENTION

The present invention relates to an attachment structure for brush holder springs in a DC motor employed as a drive source in an automotive windshield wiper, power window regulator, or the like.

One conventional attachment structure for a motor brush holder spring includes a brush holder molded integrally of synthetic resin. Brushes are supported on brush holder springs to which terminals are spotwelded for connection to leads. The assembly of the brush holder springs, the brushes, and the terminals is attached to the brush holder by insert molding. However, the brush holder springs tend to be reduced in resilient forces produced thereby because of the molded nature of the brush holder and the heat generated when the brush holder is molded at a temperature in the range of from 200° to 240 °C.

SUMMARY OF THE INVENTION

It is an object of the present invention to provide an attachment structure for brush holder springs, which permits the brush holder springs to be easily attached to a motor bracket, keeps the brush holder springs firmly anchored to the motor bracket, and allows the attached brush holder springs to press brushes mounted thereon against a commutator under sufficient resilient forces.

According to the present invention, an attachment structure for brush holder springs in a motor includes a motor bracket to be mounted on a motor frame and having a pair of diametrically opposite projections on inner peripheral wall surfaces thereof, and a pair of brush holder springs supporting on one end portion thereof brushes for sliding contact with a motor commutator and having on opposite end portions thereof gripping members fitted complementarily over the projections, under resilient forces. Since the brush holder springs are attached to the motor bracket under resilient forces, the brush holder springs can be anchored in position to the motor bracket. The attachment structure is composed of a reduced number of components, can be manufactured easily, and can be assembled efficiently.

BRIEF DESCRIPTION OF THE DRAWINGS

The present invention will be described in detail by way of illustrative example with reference to the accompanying drawings, in which.

DETAILED DESCRIPTION

Figure 1:
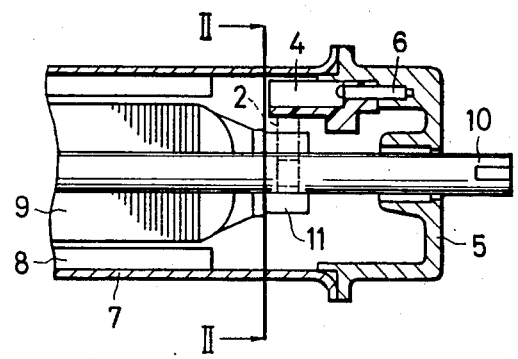
FIG. 1 is a fragmentary longitudinal cross-sectional view of a DC motor incorporating a conventional attachment structure for a brush holder spring.
Figure 2:
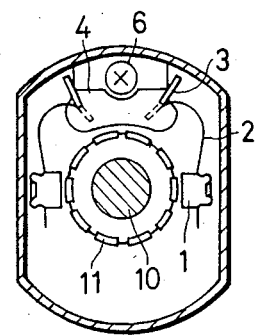
FIG. 2 is a cross-sectional view taken along line II—II of FIG. 1.
Figure 3:
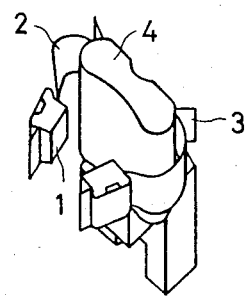
FIG. 3 is a perspective view of a brush holder in the attachment structure shown in FIG. 1.

FIGS. 1 through 3 shows a conventional attachment structure for attaching a brush holder spring in a DC motor. Carbon brushes 1 are supported on a pair of brush holder springs 2, respectively, attached at ends thereof to a brush holder 4 integrally molded of synthetic resin. Terminals 3 for connection to leads (not shown) are spotwelded to the springs 2 near the attached ends thereof. The brush holder 4 is fastened by a screw 6 to a motor bracket 5 mounted on an axial end of a motor frame 7 accommodating therein magnets 8 secured to inner wall surfaces thereof. The motor bracket 5 is normally made of aluminum by die casting. A rotor 9 is mounted on a shaft 10 rotatably supported by the motor bracket 5. A commutator 11 is also mounted on the shaft 10 and held in sliding contact with the brushes 1.

The assembly of the brushes 1, the brush holder springs 2, and the terminals 3 is attached to the brush holder 4 by insert molding. The brush holder springs 2 tend to be reduced in resilient forces produced thereby because of the molded nature of the brush holder 4 and the heat generated when the brush holder 4 is molded at a temperature in the range of from 200° to 240° C.

Figure 4:
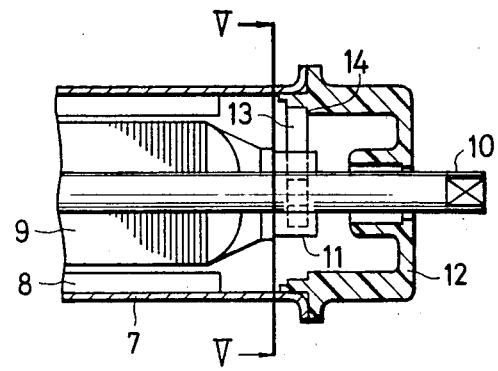
FIG. 4 is a fragmentary longitudinal cross-sectional view of a DC motor incorporating an attachment structure for a brush holder spring according to the present invention.
Figure 5:
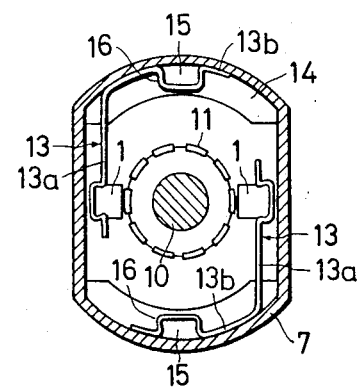
FIG. 5 is a cross-sectional view taken along line V—V of FIG. 4.
Figure 6:
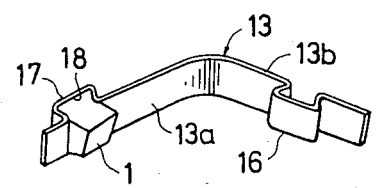
FIG. 6 is a perspective view of a brush holder in the attachment structure illustrated in FIG. 4.

FIGS. 4 through 6 illustrate an attachment structure for a brush holder spring according to the present invention. Those parts shown in FIGS. 4 through 6 which are identical to those of FIGS. 1 through 3 are denoted by identical reference numerals employed in FIGS. 1 through 3, and will not be described in detail.

A motor bracket 12 molded of synthetic resin is attached to the axial end of the motor frame 7. The motor bracket 12 has a pair of diametrically opposite steps 14 defined on inner peripheral side wall surfaces thereof, and a pair of diametrically opposite projections 15 projecting axially and radially inwardly on the steps 14. Each of the projections 15 has a transversely cross-sectional shape resembling that of a dovetail, such that its radially inward end is wider than the radially outward end thereof. A pair of brush holder springs 13 supporting the carbon brushes 1 on one end portion thereof is securely mounted in the motor bracket 12. More specifically, each of the brush holder springs 13 has a straight portion 13a supporting the brush 1 thereon and an arcuate portion 13b held against an arcuate inner wall surface of one of the steps 14 of the motor bracket 12. The arcuate portion 13b includes an integral dovetail-shaped gripping member 16 fitted complementarily over one of the projections 15. When attaching each brush holder spring 13, the gripping member 16 is force-fitted over the projection 15 in the axial direction of the motor bracket 12. The attached brush holder spring 13 is prevented from being displaced radially because of the dovetail joint between the projection 15 and the gripping member 16. The step 14 serves to position the brush holder spring 13 in the axial direction with respect to the motor bracket 12 and hence to position the carbon brushes 1 in the axial direction with respect to the commutator 11.

The gripping member 16 is contoured complementarily to the shape of the projection 15 by bending the arcuate portion 13b of the brush holder spring 13. The gripping member 16 is firmly attached to the projection 15 under its own resiliency, as well as due to the dovetail joint.

The straight portion 13a of each brush holder spring 13 has a dovetail-shaped gripping member 17 similar to the gripping member 16. The carbon brush 1 is securely anchored to the straight portion 13a by the gripping member 17. The gripping member 17 has a pointed tooth 18 projecting into biting engagement with the carbon brush 1 retained by the gripping member 17 for preventing the carbon brush 1 from moving in the axial direction of the shaft 10.

Although a certain preferred embodiment of the present invention has been shown and described in detail, it should be understood that various changes and modifications may be made therein without departing from the scope of the appended claims.

We claim:

1. An attachment structure for brush holder springs in a motor having frame and a shaft supporting a commutator, comprising:
    (a) a motor bracket adapted to be mounted on the motor frame and having a pair of diametrically opposite projections on inner peripheral wall surfaces thereof, each of said projections having a transverse dovetail-shaped cross section including a radially inward end wider than a radially outward end thereof; and
    (b) a pair of brush holder springs supporting on one end portion thereof brushes, respectively, for sliding contact with the commutator and having on an opposite end portion thereof a gripping member fitting complementarily over said projections, respectively, under resilient forces, each of said gripping members having a dovetail-shaped configuration complementary to one of said projections.

2. An attachment structure according to claim 1, wherein said motor bracket has a pair of diametrically opposite steps against which said brush holder springs are held, respectively, for being positioned parallel to the shaft.

3. An attachment structure according to claim 1, wherein each of said brush holder springs is composed of a straight portion including said one end portion supporting said brush and an arcuate portion including said opposite end portion having said gripping member and held against an arcuate inner wall surface of said motor bracket.

4. An attachment structure for brush holder springs in a motor having a motor frame and a shaft supporting a commutator, comprising:
    a motor bracket adapted to be mounted on the motor frame and having a pair of diametrically opposite projections on inner peripheral wall surfaces thereof; and
    a pair of brush holder springs each supporting on one end portion thereof a brush for sliding contact with the commutator and each spring having on an opposite end portion thereof a gripping member fitted respectively over said projections under resilient force, wherein said gripping members and said projections have cross-sections corresponding to each other enabling each gripping member to fit over the associated projection in snap-fitting engagement.

* * * * *